Nov. 17, 1964  F. R. GREENAN  3,157,158
AUTOMATIC FEEDING MECHANISM FOR LIVESTOCK AND POULTRY
Filed Oct. 18, 1962
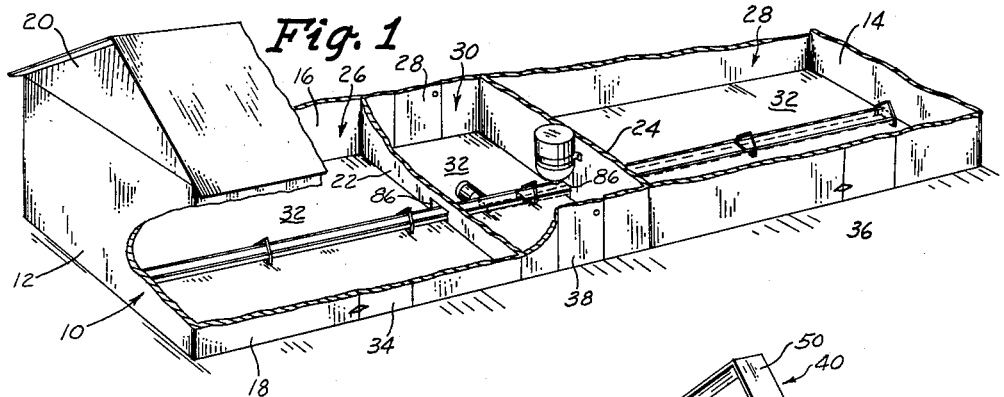
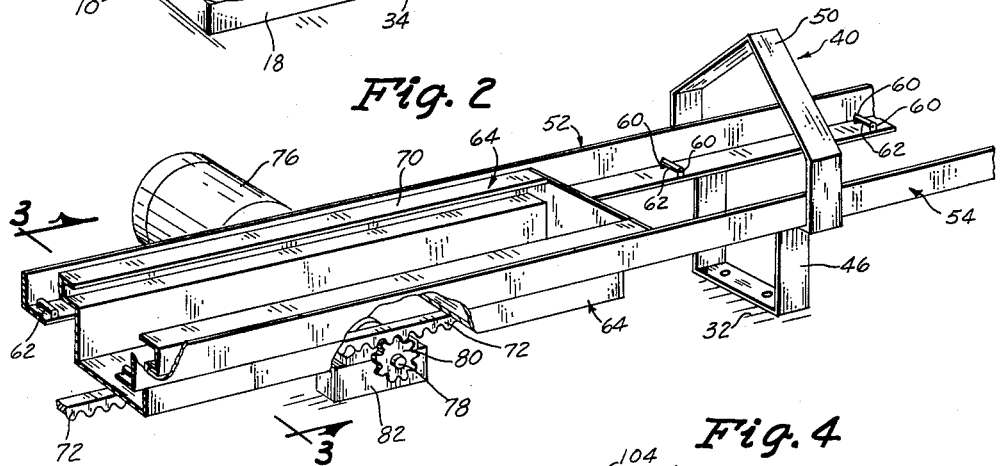
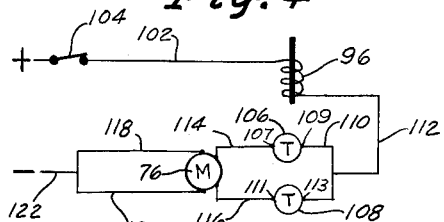
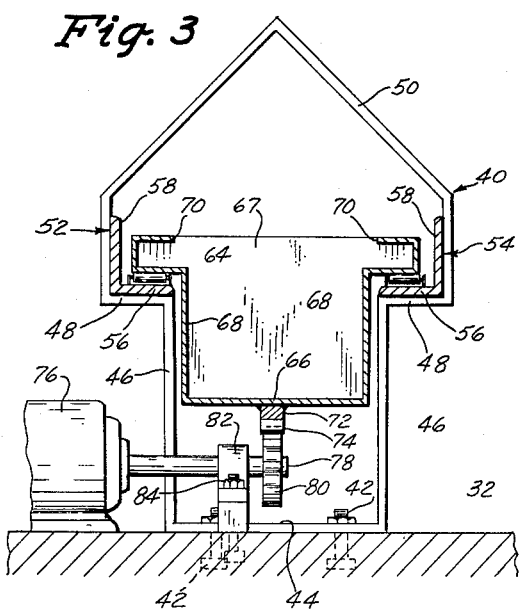
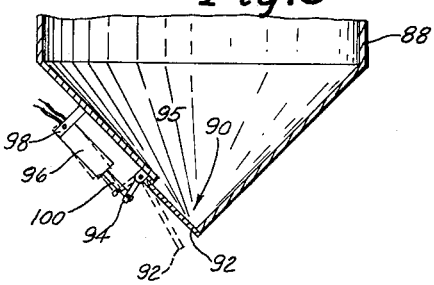
INVENTOR
FREEDA R. GREENAN
BY
Dick, Zarley & Henderson
ATTORNEYS

United States Patent Office 3,157,158
Patented Nov. 17, 1964

3,157,158
AUTOMATIC FEEDING MECHANISM FOR LIVESTOCK AND POULTRY
Freeda Roth Greenan, 403 S. Main, Hope, Ark., assignor of one-half to J. W. Fulton, Jr., Shreveport, La.
Filed Oct. 18, 1962, Ser. No. 231,369
4 Claims. (Cl. 119—51.11)

It has been determined that certain advantages result in intermittently feeding both livestock and poultry. The devices which have been designed to accomplish this result normally provide an auger or chain in the bottom of a trough which makes it impossible for the birds and animals to clean up all of the feed. Some devices cause the feed to follow a circuitous path from a supply hopper to the feeding area and thence back to the supply hopper. This arrangement is unsatisfactory in that it allows the birds or animals to pick over certain parts of the feed which gives an unbalanced diet to the birds or animals further away from the hopper. The chain type feeder must negotiate corner turns in the trough and feed often overflows at these points. In addition, this system required many moving parts and an extremely powerful drive drive unit is needed to move the feed in this manner. Both auger and chain type feeders have difficulty in maintaining a positive feed level within the trough, and these units require frequent attention of an operator to be certain that all mechanical devices are operating perfectly. Also, the complicated nature of the devices known to me generally require factory trained personnel to make the installation, and these devices are normally heavy and cumbersome to handle. These units also must be adjusted as the type of feed being supplied is changed.

Therefore, a principal object of my invention is to provide an automatic feeding mechanism for livestock and poultry which will automatically and intermittently supply feed in desired quantities and at desired intervals of time.

A further object of my invention is to provide an automatic feeding mechanism for livestock and poultry wherein the animals or birds can completely clean the feed from the feeding troughs if desired.

A still further object of my invention is to provide an automatic feeding mechanism for livestock and poultry which will make available to the animals or birds an entire trough of feed within a brief period of time to permit all of the animals and birds substantially simultaneous access to the feeding trough.

A still further object of my invention is to provide an automatic feeding mechcanism for livestock and poultry that will not spill feed from the trough and which can maintain a predetermined level of feed in the trough.

A still further object of my invention is to provide an automatic feeding mechanism for livestock and poultry that requires few moving parts, and which can be operated with a relatively small power source.

A still further object of my invention is to provide an automatic feeding mechanism for livestock and poultry that will automatically function without the constant attention of an operator.

A still further object of my invention is to provide an automatic feeding mechanism for livestock and poultry that is easy to install and which can be easily moved.

A still further object of my invention is to provide an automatic feeding mechanism for livestock and poultry that can easily accommodate different types of feeds.

Still further objects of my invention are to provide an automatic feeding mechanism for livestock and poultry that is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawing, in which:

FIGURE 1 is a perspective view of my device housed in a building specifically designed to accommodate my system;

FIGURE 2 is a partial perspective view at an enlarged scale of my trough, track and power means with portions of the trough being cut away to more fully illustrate its construction;

FIGURE 3 is a sectional view at an enlarged scale of my device taken on line 3—3 of FIGURE 2;

FIGURE 4 is a wiring diagram of the electrical power and control elements of my device; and FIGURE 5 is a partial sectional view at an enlarged scale of the discharge opening of my hopper unit.

I have used the numeral 10 to generally designate an elongated rectangular building which is comprised of end walls 12 and 14, side walls 16 and 18, and roof 20 extending over the walls in conventional manner. Partitions 22 and 24 extend across the interior of building 10 to divide the building into two end feeding compartments or areas 26 and 28 with an intermediate compartment 30. A suitable floor surface 32 extends throughout the bottom of the building 10. Doors 34, 36 and 38 are located in the side walls whereby access can be gained to compartments 26, 28 and 30, respectively.

Track supports 40 are spaced apart in aligned relation along the centerline of building 10 and are secured to floor 32 by nut and bolt assemblies 42. It is sometimes desirable to suspend track supports 40 from the roof 20 of building 10. Track supports 40 are constructed of strap iron or the like and are comprised of a horizontal bottom portion 44 which has its opposite ends terminating in vertical portions 46. A horizontal shelf 48 is formed at the tops of vertical portions 46. The track supports then extend upwardly from shelves 48 and are joined together by an inverted V-shaped portion 50.

Elongated tracks 52 and 54 are comprised of L-shaped angles having a horizontal flange 56 which rests on shelf 48, and a vertical flange 58 which extends upwardly from the outer edge thereof. Tracks 52 and 54 can be secured to track supports 40 by welding or the like. Oppositely disposed pairs of ears 60 are rigidly secured to flange 56 of tracks 52 and 54, and rollers 62 are rotatably secured therebetween in any convenient fashion so that the rollers are disposed at a right angle with respect to the longitudinal axis of the tracks.

An elongated trough 64 is comprised of a flat bottom 66; end portions 67; and vertical sides 68 which terminate in outwardly extending horizontally disposed U-shaped flanges 70. The bottoms of flanges 70 rest on the tops of rollers 62 as shown in FIGURE 3. An elongated gear rack 72 having downwardly extending teeth 74 is welded or otherwise secured to the outside surface of the bottom 66 of trough 64. An electrical motor 76 is rigidly secured to the floor 32 in the center of compartment 30 in any convenient fashion, and power shaft 78 thereof extends underneath trough 64. A gear 80 is rigidly secured to the outer end of shaft 78 and is in mesh with the teeth of gear rack 72. A bearing element 82 embraces and supports shaft 78 and is anchored to floor 32 by nut and bolt assemblies 84.

As shown in FIGURE 1, the track structure comprised of track supports 40 and tracks 52 and 54 extends for substantially the full length of building 10 and passes through openings 86 in partitions 22 and 24. The length of trough 64 can vary but is preferably slightly longer than one-half the length of the track structure so that the gear 80 on motor shaft 78 will always be in mesh with the gear rack 72 on the bottom of the trough.

A feed hopper 88 is preferably centrally located in compartment 30 and can be supported in any convenient fashion on partition 24 as shown in FIGURE 1. The lower end of hopper 88 is in the shape of an inverted cone with a discharge opening 90 at the bottom thereof. A gate 92 is hingedly secured to hopper 88 at 93 and is adapted to close opening 90. An arm 94 rigidly extends from gate 92. Solenoid 96 is pivotally secured to hopper bracket 98 and the solenoid plunger 100 has its outer end pivotally secured to the outer end of arm 94. The solenoid is spring-loaded in conventional fashion to normally hold gate 92 in the closed position shown by the solid lines in FIGURE 5. Upon being electrically energized, the solenoid plunger is withdrawn and the gate 92 is moved to the open position shown by the dotted lines in this same figure.

With reference to FIGURE 4, lead wire 102 is connected to the positive side of a source of electrical energy and extends to one side of the coil in solenoid 96. A master switch 104 is imposed in lead wire 102. Two conventional adjustable electrical timing elements 106 and 108 having points 107, 109 and 111, 113 respectively are connected in parallel by lead 110. Lead 112 connects solenoid 96 with lead 110. Lead 114 connects timing element 106 with the field windings of motor 76, and lead 116 connects the motor windings to timing element 108. Leads 118 and 120 are secured to opposite sides of the windings of motor 76 and lead 122 is connected thereto and extends to the negative side of the power supply. The passage of current through motor 76 from lead 114 will cause motor shaft 78 to rotate in one direction, and the passage of current therethrough from lead 116 to 120 will cause rotation of shaft 78 in the opposite direction.

The normal operation of my device is as follows: The trough 64 can be positioned in compartment 26 as shown in FIGURE 1. The timing elements 106 and 108 are set to close at predetermined intervals and to remain closed for predetermined periods. For example, if it is desired to have the animals or poultry in compartments 26 and 28 on feed for intermittent periods of four hours each, and it required a period of five minutes to move trough 64 from a feeding position in one compartment to a similar position in the other compartment, each of the timing elements would be set to become closed for five minutes each eight hours. The eight hour period of one timing element should begin four hours after the beginning of the eight hour period of the other timing element.

Thus, upon the closing of the master switch 104, the entire circuitry in FIGURE 4 would remain inactive until the points in timing element 106 become closed for a five minute interval at the beginning of an eight hour period. When the points in timing element 106 close, the points in timing element 108 remain open and will continue to remain open for four hours. The closing of the points in timing element 106 causes a circuit to be completed from lead 102, through solenoid 96, through lead 112, through lead 110 to timing element 106, through lead 114, through motor 76, through lead 118 and thence through lead 122. The "closing" of this circuit causes solenoid 96 to open the gate 92 on hopper 88. At the same time, motor shaft 78 will rotate gear 80 in one direction which will pull gear rack and trough 64 in a direction on tracks 52 and 54 from compartment 26, through compartment 30 and thence into compartment 28. As the trough 64 moves under the open hopper 88, feed in the hopper passes through the discharge opening 90 into the bottom of the trough. The uniform speed of the trough and the predetermined flow of feed from the hopper will result in a constant level of feed being supplied to the trough. The flow of feed from the hopper obviously may be varied by changing the relationship of the solenoid-holding bracket 98 with respect to hopper 88 or by utilizing a longer or shorter solenoid.

As indicated above, the operational time element of motor 76 is coordinated by the timing elements 106 and 108 to give the motor sufficient time to move the trough from one feeding compartment to the other. As such, when the points in timing element 106 open, the trough 64 will cease moving but will have been moved to the position shown by the dotted lines in FIGURE 1. As the points of timing element 106 open, the solenoid 96 will become de-energized and gate 92 on hopper 88 will close. The trough 64 will remain in feeding compartment 28 for four hours, or whatever the predetermined period of time happens to be. When the points close for a five minute period in timing element 108, the motor circuit will then be completed through timing element 108, lead 116 and lead 120 so that the motor shaft 78 will rotate in an opposite direction. Trough 64 will then be returned to its original position and the opening of hopper gate 92 will permit the feed supply in the trough to be replenished.

Thus, from the foregoing, it is seen that my invention will accomplish at least all of its stated objectives, and most specifically will permit substantially automatic feeding of livestock and poultry on an intermittent basis.

Some changes may be made in the construction and arrangement of my automatic feeding mechanism for livestock and poultry without departing from the real spirit and purpose of my invention, and it is my intention to cover by my claims, any modified forms of structure or use of mechanical equivalents which may be reasonably included within their scope.

I claim:

1. In a feeding mechanism for livestock and poultry,
   a track structure,
   a power means, said means including a reversible electric motor,
   a power control means,
   a trough movably supported on said track structure,
   connecting means operatively connecting said trough and said power means, when attached, can move said trough on said track structure,
   a feed supply hopper with a closable opening mounted over said trough,
   said control means including a first lead wire extending from the positive side of a source of electrical energy to one side of a coil in a solenoid, said first lead wire including a master switch imposed therein, a first and second adjustable electrical timing element, connected in parallel by a second lead wire, a third lead wire connecting said solenoid with said second lead wire, a fourth lead wire connecting said first timing element with the field windings of said reversible electrical motor, a fifth lead wire connecting the windings of said motor to said second timing element, a sixth and seventh lead wire secured to opposite sides of said windings of said motor, and an eighth lead wire connected to said sixth and seventh wires and extending to the negative side of said source of electrical energy,
   said solenoid being operatively connected to a closure gate on said hopper,
   said motor being operatively connected to said trough, said solenoid normally holding said closure gate in a closed position whereby said solenoid will open said gate when said motor is energized.

2. The structure of claim 1 wherein said control means includes means to intermittently move said trough in opposite directions and hold said trough stationary for a predetermined period between periods of movement.

3. In a feeding mechanism for livestock and poultry,
   a track structure,
   a power means, said means including a reversible electric motor,
   a power control means,
   a trough movably supported on said track structure, connecting means operatively connecting said trough and said power means, when attached, can move said trough on said track structure, a feed supply hopper with a closable opening mounted over said trough, said control means including a solenoid operatively connected to a closure gate on said hopper adjacent said opening; said solenoid being connected to a positive side of a source of electrical energy and connected to first and second timing elements which are parallel connected; said first and second timing elements being operatively connected to said reversible motor, said reversible motor being operatively connected to the negative side of a source of electrical energy, said motor being operatively connected to said trough, said solenoid normally holding said closure gate in a closed position whereby said solenoid will open said gate when said motor is energized.

4. The structure of claim 3 wherein said control means is adapted to intermittently move said trough in opposite directions and hold said trough stationary for a predetermined period between periods of movement.

References Cited in the file of this patent

UNITED STATES PATENTS

| | | |
|---|---|---|
| 779,434 | Lyon | Jan. 10, 1905 |
| 2,325,441 | Tucker et al. | July 27, 1943 |
| 2,782,760 | Wolfe | Feb. 26, 1957 |
| 2,987,038 | Cole | June 6, 1961 |

FOREIGN PATENTS

| | | |
|---|---|---|
| 3,450 | Great Britain | of 1915 |